NOISE SUPPRESSOR SYSTEM FOR A SUPERREGENERATIVE RECEIVER

Filed Oct. 22, 1959

United States Patent Office 3,015,728
Patented Jan. 2, 1962

3,015,728

NOISE SUPPRESSOR SYSTEM FOR A SUPERREGENERATIVE RECEIVER

Donald Richman, Fresh Meadows, N.Y., assignor to Hazeltine Research, Inc., a corporation of Illinois
Filed Oct. 22, 1959, Ser. No. 847,989
6 Claims. (Cl. 250—20)

This invention relates to a noise suppressor system and more particularly to a noise suppressor system for a superregenerative wave-signal receiver and hence will be described in that environment. As used throughout the specification, the term "modulated quench signal" refers to the envelope of superregenerative oscillations produced by a superregenerative receiver. The term "incoming signal" refers to a wave-signal radiated from a remote transmitter, which arrives at the antenna of the receiver under consideration.

Superregenerative receivers of both the separately quenched and self-quenched types have found wide utility due to their exceedingly high sensitive, extreme simplicity and inexpensive construciton. However, the inherent characteristics of the superregenerative process are such that in the absence of an incoming signal the superregenerative amplifier is activated by the available circuit noise. The result in prior receivers has been an undesirable rush of noise at the output of the receiver when the receiver is not tuned to an incoming signal. This noise is particularly disturbing when the receiver is being tuned over a frequency band between incoming signals, as is the case when a station is selected by tuning a broadcast receiver. It is therefore desirable to make possible a superregenerative receiver which is quieted in the absence of an incoming signal.

It is an object of this invention, therefore, to make possible a noise suppressor system for a superregenerative receiver which avoids one or more disadvantages present in prior art arrangements.

It is a further object of this invention to provide a noise suppressor system capable of quieting a superregenerative receiver in the absence of an incoming signal.

In accordance with the invention, the noise suppressor system for a superregenerative receiver comprises first means for supplying a modulated quench signal, second means coupled to the first means for selecting a portion of the frequency spectrum of the modulated quench signal, said portion lying between adjacent harmonics of quench frequency and separated from said harmonics by a frequency differential exceeding the maximum modulation frequency; and means coupled to the second means for deriving from the selected signal a control effect dynamically responsive to the noise information and for using the control effect to control the audio gain of the receiver.

For a better understanding of the present invention, together with other and further objects thereof, reference is had to the following description taken in connection with the accompanying drawings, and its scope will be pointed out in the appended claims.

Figure 1:
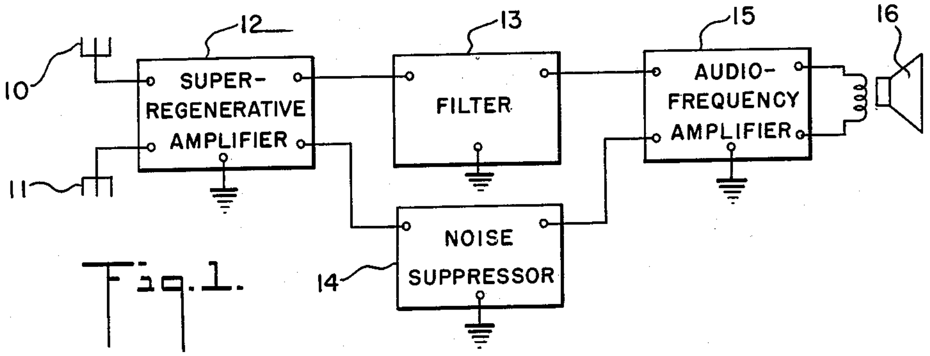
FIG. 1 is a schematic diagram of a radio receiver embodying one form of the present invention.

Referring to FIG. 1, there is shown a complete modulated-carrier signal receiver of the superregenerative type utilizing the invention. This receiver comprises, in cascade: an antenna-ground circuit 10, 11; a superregenerative amplifier 12; a filter 13 and a noise suppressor system 14, each coupled between the superregenerative amplifier

12 and an audio-frequency amplifier 15; and a sound reproducer 16.

Figure 2:
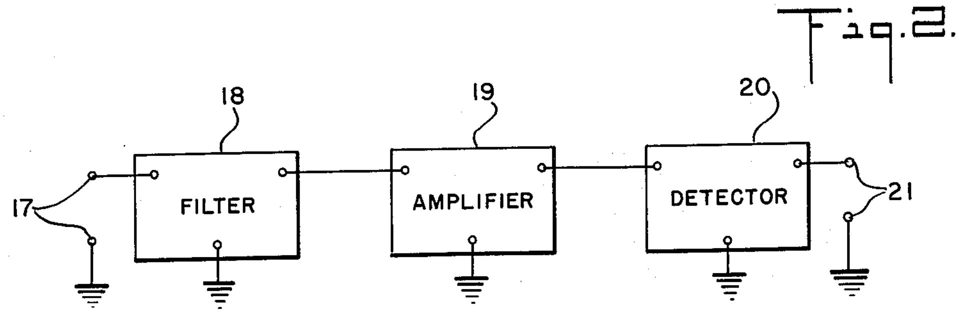
FIG. 2 is a schematic diagram of parts of a receiver in greater detail.

FIG. 2 represents one form of noise suppressor system 14 of FIG. 1, including: input terminals 17; filter 18; amplifier 19; detector 20; and output terminals 21.

Amplifier 12 may be viewed as a means for supplying a modulated quench signal. Filter 18 may be viewed as a means for selecting a portion of the frequency spectrum of the modulated quench signal, which portion can contain only noise modulation information. Detector 20 may be viewed as a means for deriving from the selected signal a control effect dynamically responsive to said noise information and for using the control effect to control the audio gain of the receiver, as by applying the control effect to amplifier 15.

All of the components of the superregenerative receiver may be of any suitable construction, containing one or more stages as applicable.

Neglecting the operation of the noise suppressor system 14, the receiver of FIG. 1 comprises in general a conventional superregenerative receiver whose operation is basically as follows. An incoming signal intercepted by the antenna-ground circuit 10, 11 is selected and amplified in the superregenerative amplifier 12. Assuming the incoming signal to be several times larger in amplitude than the associated noise, the output of superregenerative amplifier will be a modulated quench signal whose frequency spectrum will resemble FIG. 3. (In FIG. 3, $f_q$ represents quench frequency and $f_{mm}$ represents the maximum modulation frequency of the incoming signal.) The modulated quench signal is applied to filter 13, wherein the audio modulation components (which lie between 0 and $f_{mm}$ in FIG. 3) are selected and supplied to audio-frequency amplifier 15, wherein these signal components are amplified and delivered to the sound reproducer 16 for reproduction.

Figure 4:
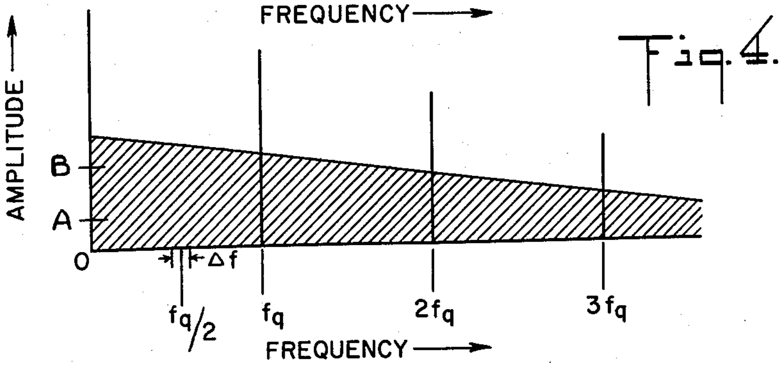

In the absence of incoming signal and suppressor 14 the superregenerative amplifier is activated by random noise and the resulting modulated quench signal will resemble FIG. 4, which depicts a continuous noise spectrum with larger components at harmonics of quench frequency. In this case, noise takes the place of the audio modulation components selected by filter 13 above and is passed to audio amplifier 15. This noise is amplified in audio amplifier 15, and becomes extremely disturbing as sound reproducer 16 converts it to loud audio noise.

Figure 3:
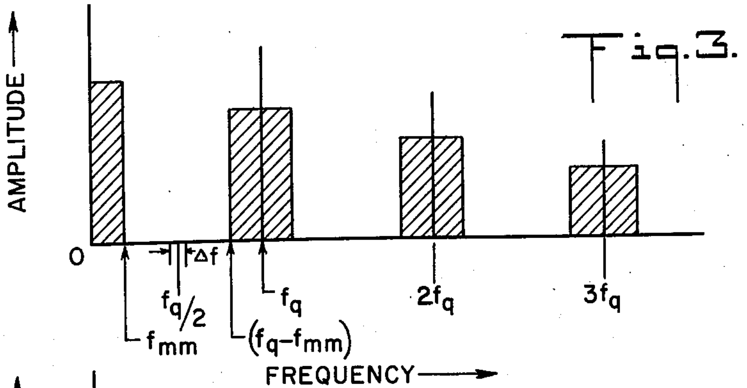
FIGS. 3 and 4 are graphical representations of the frequency spectrum of modulated quench signals utilized in explaining the operation of the receiver of FIG. 1.

Referring to both FIG. 3 and FIG. 4 now, it will be seen that when an incoming signal is being received, the energy in the modulated quench signal will be contained in discrete side-bands associated with harmonics of quench frequency thus leaving holes or gaps in the frequency spectrum. When no signal is received, the frequency spectrum of the modulated quench signal will contain no holes or gaps, but will be continuous.

The operation of FIG. 1 including the present invention is as follows. (For this explanation, noise suppressor 14 of FIG. 1 is assumed to consist of the components shown in FIG. 2.) The modulated quench signal produced by superregenerative amplifier 12 is coupled to filter 18 which selects a small portion $\Delta f$ of the frequency spectrum as indicated in FIG. 3 and FIG. 4. Energy existing in this portion $\Delta f$ of the frequency spectrum is passed on to amplifier 19 which amplifies any signals present. These amplified signals are supplied to detector 20 wherein a D.C. voltage proportional to the amplitude of the signals is derived. This D.C. voltage is then used as a control voltage to control the audio gain of audio-frequency amplifier 15.

In operation, signals reach amplifier 19 only when noise appears at the frequencies included in the range of frequencies $\Delta f$ as shown in FIGS. 3 and 4. The receiver is designed so that when the amplitude of the signals reaching amplifier 19 exceeds amplitude A in FIG. 4, the control voltage developed in detector 20 is sufficient to begin to decrease the gain of audio amplifier 15. When signals reaching amplifier 19 are equal to or greater than amplitude B in FIG. 4, the control voltage developed is sufficient to inactivate audio amplifier 15 completely.

In actual operation when an incoming signal is being received, no significant signals appear within the range of frequencies $\Delta f$ and therefore the receiver operates in a conventional manner (small signals are present, but these are negligible if the incoming signal-to-noise ratio is several times greater than unity as has been assumed). However, when no incoming signal is received, appreciable noise signals do appear at the frequencies included in $\Delta f$ and quieting of the receiver results.

As a practical illustration, the parameters involved might be as follows:

| | |
|---|---|
| Maximum modulation frequency, $f_{mm}$ kilocycles | 3 |
| Quench frequency, $f_q$ do | 25 |
| Range of frequencies, $\Delta f$ do | 9–9.5 |
| Amplitude, A microvolts | 2 |
| Amplitude, B do | 10 |

Thus it will be seen (with reference to FIG. 3) that between the highest modulation frequency component of the side-band related to zero frequency ($f_{mm}$=3 kc.) and the lowest frequency component of the lower side-band related to the first harmonic of quench frequency ($f_q-f_{mm}$=22 kc.) there is a gap of 19 kc. in which no energy is present when an incoming signal is being received. If signals appearing in the portion of the frequency spectrum of the modulated quench signal between 9 and 9.5 kilocycles are selected and amplified, control voltage can be derived from these amplified signals and used to control audio gain as previously described.

Design of the noise suppressor system is preferably such that if the amplitude of the signals appearing in the range of frequencies between 9 and 9.5 kc. is less than 2 microvolts, no reduction in the audio gain will reslult. However, as the amplitude goes above 2 microvolts, the audio gain will begin to be decreased until when the amplitude reaches 10 microvolts the receiver will be completely silenced.

It should be appreciated that gaps in the frequency spectrum such as that described above will exist also between adjacent higher harmonics of quench frequency. These gaps can be utilized in the same manner as described above by selecting portions of the frequency spectrum lying approximately midway between adjacent harmonics of quench frequency. Such portions would lie near odd harmonics of half quench frequency.

Thus, it may be seen that the arrangement of FIG. 1 results in a superregenerative receiver which is quieted in the absence of an incoming signal. Noise which was extremely disturbing in previous receivers is efficiently suppressed in receivers using the present invention.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A noise suppressor system for a super-regenerative receiver comprising: first means for supplying a modulated quench signal; second means coupled to said first means for selecting a portion of the frequency spectrum of said modulated quench signal, said portion lying between adjacent harmonics of quench frequency and separated from said harmonics by a frequency differential exceeding the maximum modulation frequency; and means coupled to said second means for deriving from said selected signal a control effect dynamically responsive to noise information and for using the control effect to control the audio gain of said receiver.

2. A noise suppressor system for a super-regenerative receiver comprising: first means for supplying a modulated quench signal; second means coupled to said first means for selecting a portion of the frequency spectrum of said modulated quench signal, said portion lying approximately midway between adjacent harmonics of quench frequency; and means coupled to said second means for deriving from said selected signal a control effect dynamically responsive to noise information and for using the control effect to control the audio gain of said receiver.

3. A noise suppressor system for a super-regenerative receiver comprising: first means for supplying a modulated quench signal; second means coupled to said first means for selecting a predetermined fixed portion of the frequency spectrum of said modulated quench signal, said portion lying near an odd harmonic of half quench frequency; and means coupled to said second means for deriving from said selected signal a control effect dynamically responsive to noise information and for using the control effect to control the audio gain of said receiver.

4. A noise suppressor system for a super-regenerative receiver comprising: first means for supplying a modulated quench signal; filter means coupled to said first means for selecting a portion of the frequency spectrum of said modulated quench signal, said portion lying between adjacent harmonics of quench frequency and separated from said harmonics by a frequency differential exceeding the maximum modulation frequency; amplifying means coupled to said filter means for amplifying said selected signal; and means coupled to said amplifying means for deriving from said selected signal a control effect dynamically responsive to noise information and for using the control effect to control the audio gain of said receiver.

5. A noise suppressor system for a super-regenerative receiver comprising: first means for supplying a modulated quench signal; filter means coupled to said first means for selecting a portion of the frequency spectrum of said modulated quench signal, said portion lying approximately midway between two adjacent harmonics of quench frequency; amplifying means coupled to said filter means for amplifying said selected signal; and means coupled to said amplifying means for deriving from said selected signal a control effect dynamically responsive to noise information and for using the control effect to control the audio gain of said receiver.

6. A noise suppressor system for a super-regenerative receiver comprising: first means for supplying a modulated quench signal; second means coupled to said first means for selecting a portion of the frequency spectrum of said modulated quench signal, which portion lies in the vicinity of half quench frequency; and means coupled to said second means for deriving from said selected signal a control effect dynamically responsive to noise information and for using the control effect to control the audio gain of said receiver.

References Cited in the file of this patent

UNITED STATES PATENTS

| | | |
|---|---|---|
| 2,271,522 | Luck | Feb. 3, 1942 |
| 2,314,707 | Katzin | Mar. 3, 1943 |
| 2,341,325 | Kenefake | Feb. 8, 1944 |
| 2,527,617 | Berger | Oct. 31, 1950 |
| 2,657,306 | Williams | Oct. 27, 1953 |
| 2,756,328 | Braak | July 24, 1956 |
| 2,798,900 | Bradley | July 9, 1957 |